United States Patent [19]

Isono et al.

[11] 4,261,010
[45] Apr. 7, 1981

[54] BEAM INDEX COLOR TELEVISION RECEIVER APPARATUS

[75] Inventors: Katsuo Isono, Kawagoe; Tomoyoshi Imayasu, Urawa, both of Japan

[73] Assignee: Sony Corporation, Tokyo, Japan

[21] Appl. No.: 97,869

[22] Filed: Nov. 27, 1979

[30] Foreign Application Priority Data

Dec. 5, 1978 [JP] Japan ................ 53-150731

[51] Int. Cl.³ .......................................... H04N 9/24
[52] U.S. Cl. ...................................... 358/67; 358/69
[58] Field of Search .................. 358/67, 68, 69, 70, 358/74, 66

[56] References Cited

U.S. PATENT DOCUMENTS

| | | | |
|---|---|---|---|
| 2,989,583 | 6/1961 | Thompson | 358/69 |
| 3,258,527 | 6/1966 | Thompson | 358/69 |
| 3,688,204 | 8/1972 | Van Den Avoort | 358/69 |
| 3,748,375 | 7/1973 | Sunstein | 358/69 |

FOREIGN PATENT DOCUMENTS 897984  6/1972  United Kingdom ............ 358/67

*Primary Examiner*—Benedict V. Safourek
*Assistant Examiner*—Michael Allen Masinick
*Attorney, Agent, or Firm*—Lewis H. Eslinger; Alvin Sinderbrand

[57] ABSTRACT

In a beam index color television receiver of the type having a cathode ray tube which is provided with beam-excitable color elements disposed on a display screen of the cathode ray tube and index elements which are scanned by an electron beam as the beam scans the display screen, an apparatus for controlling the beam includes an index signal generator for generating a periodic index signal as the index elements are scanned by the beam, color gates which sequentially gate respective color control signals individually to modulate the electron beam as the beam scans the color elements, a gating signal circuit which generates sequential gating signals at a frequency synchronized with the frequency of the periodic index signal and which supplies the gating signals in sequence to the color gates to control the latter so as to gate the respective color control signals, and a phase-controlling circuit for controlling the phase of the gate pulse signals in response to the highest-level one of the color control signals.

13 Claims, 27 Drawing Figures

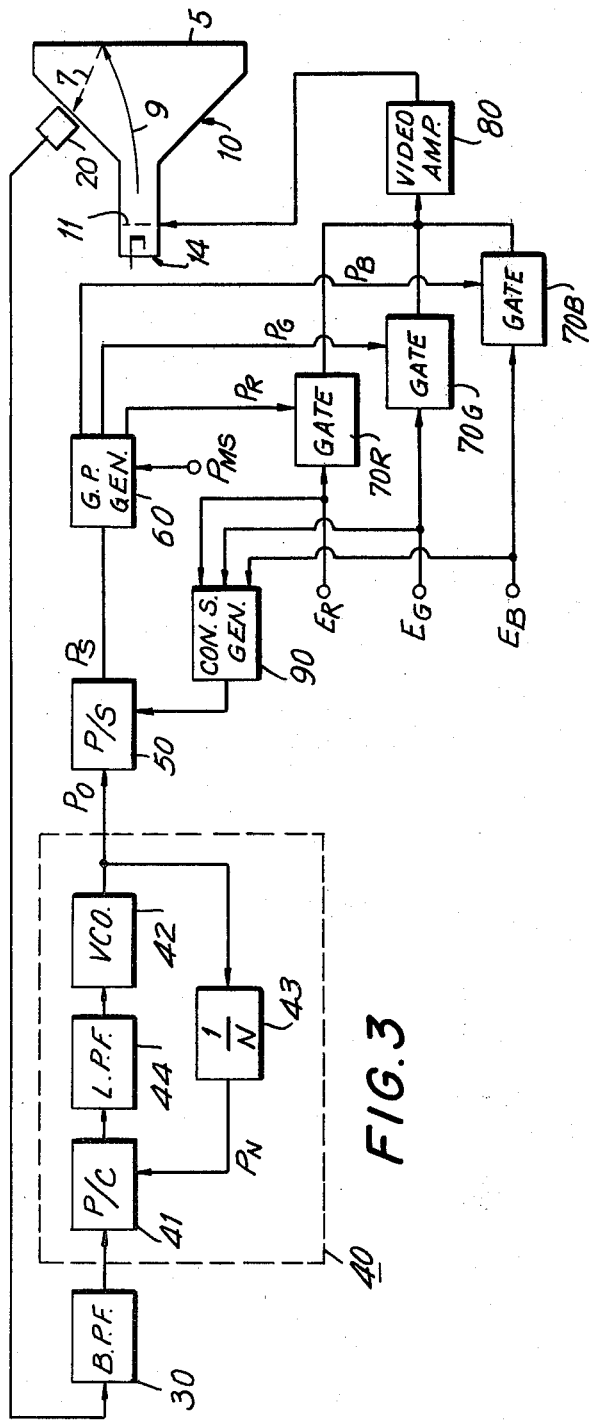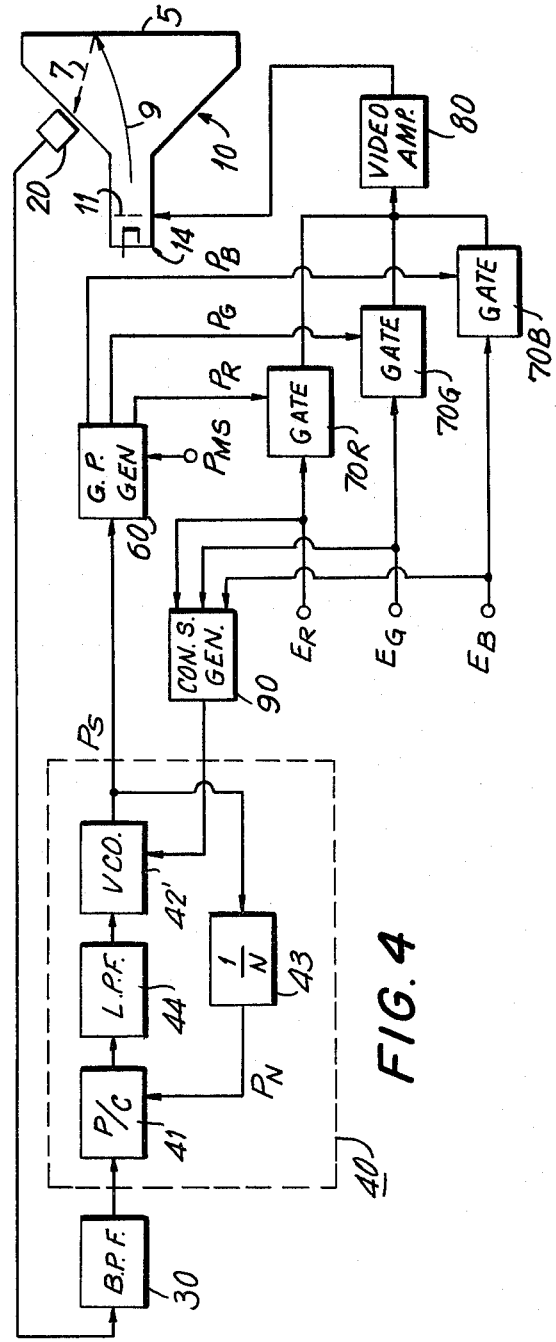

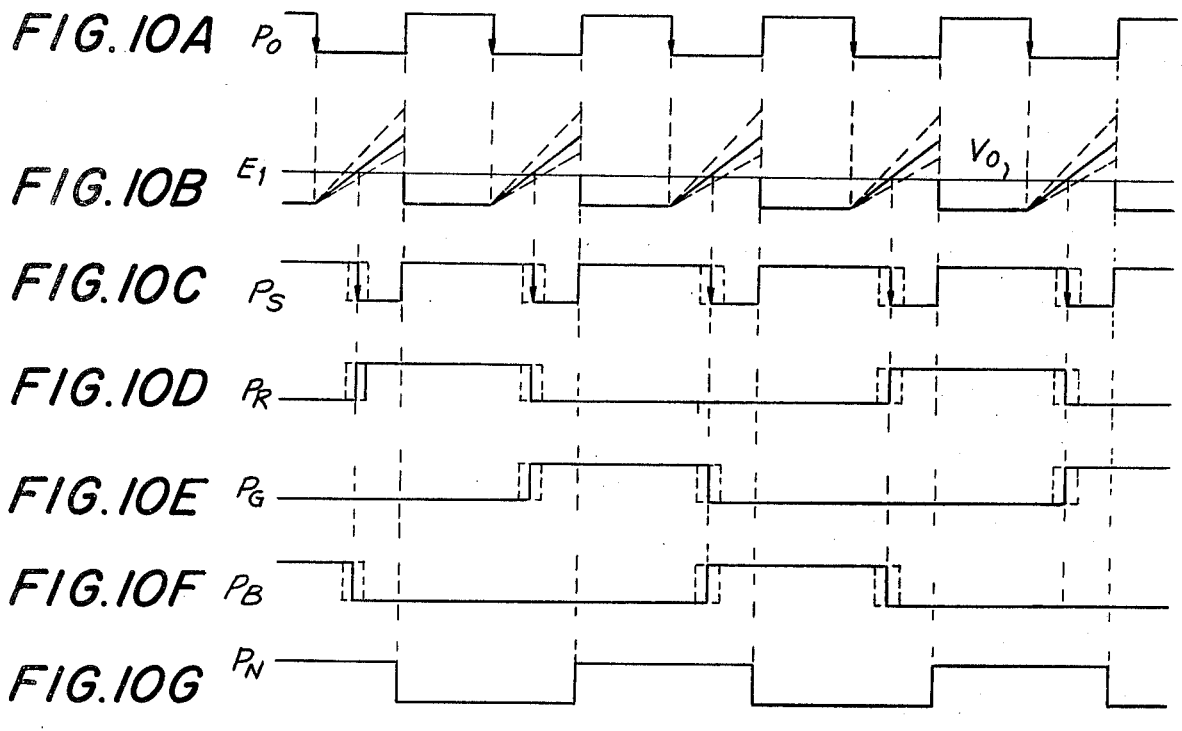
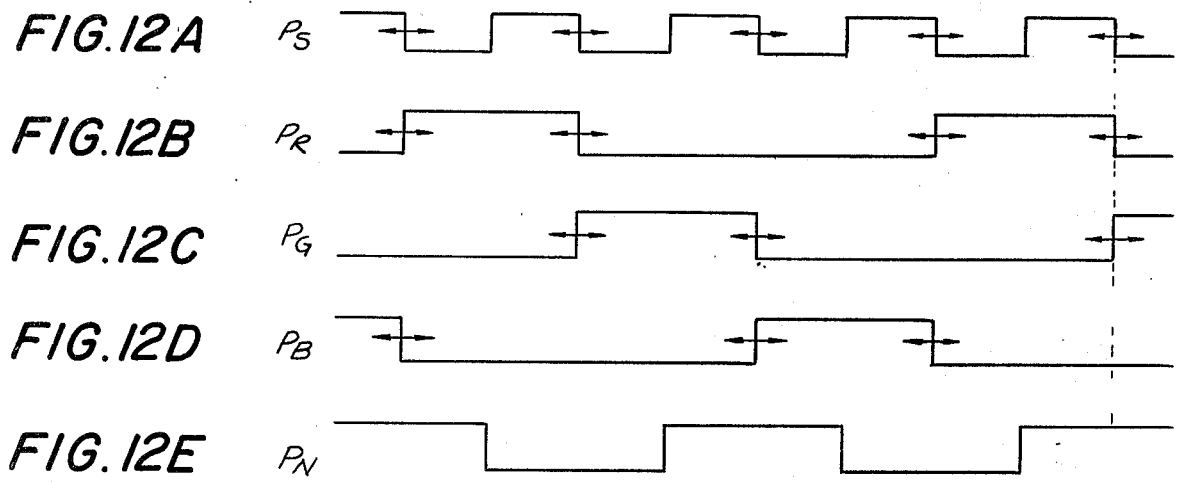

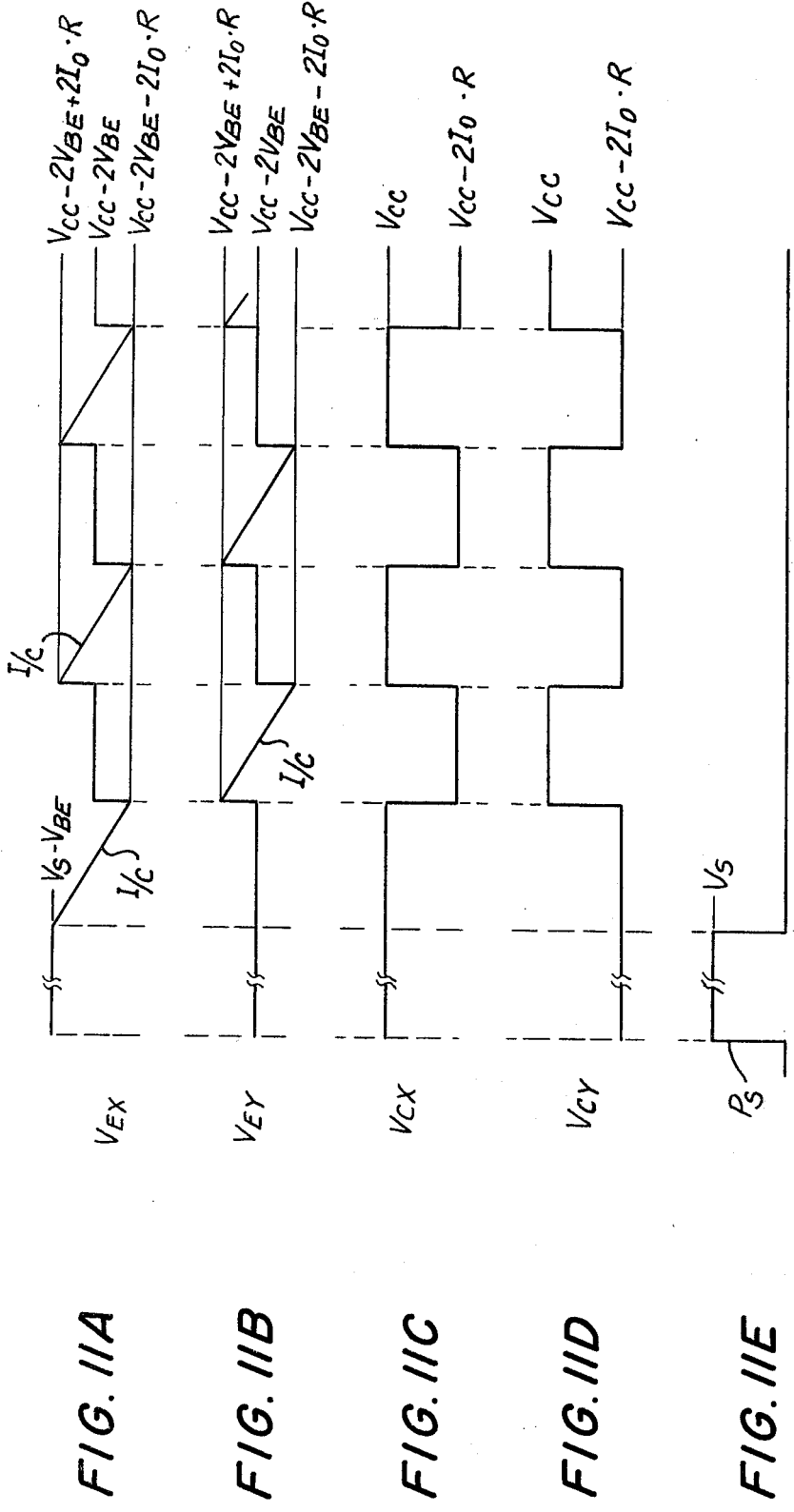

BEAM INDEX COLOR TELEVISION RECEIVER APPARATUS

BACKGROUND OF THE INVENTION

This invention relates generally to beam index color television receivers and, more particularly, is directed to a circuit for controlling the electron beam in a beam index color television receiver.

Beam index color television receivers are known wherein the display screen of the cathode ray tube has periodic index stripes in addition to the usual beam-excitable color elements, such as, red (R), green (G) and blue (B) phosphor stripes. The phosphor stripes, as is conventional, are arrayed in RGB triads, repetitively across the display screen so as to be scanned by the electron beam as the latter effects a horizontal line scan in, for example, left-to-right traverse. As the electron beam scans the color phosphor stripes, it also scans the index stripes which, typically, also are phosphor stripes which emit light when excited by the scanning electron beam. In order to prevent light from the scanned index stripes from interfering with the displayed television picture, the index stripes are disposed on one surface of a thin metal layer and the color phosphor stripes are disposed on the opposite surface of this thin metal layer, which layer is substantially transparent to the scanning electron beam but blocks the light which is emitted by the phosphor index stripes. A photo-detector responds to each excited phosphor index stripe to produce a periodic signal whose frequency is equal to the frequency at which the phosphor index stripes are excited. Thus, as the electron beam scans a horizontal line across the display screen, the photo-detector generates a periodic index signal.

Examples of beam index color television receivers are disclosed in U.S. Applications Ser. Nos. 969,861, filed Dec. 15, 1978; 969,975, filed Dec. 15, 1978 and 972,236, filed Dec. 22, 1978, all assigned to the assignee of the instant invention.

The index signal which is derived from the scanning of the aforementioned phosphor index stripes is used to gate red, green and blue color control signals onto, for example, the first grid of the cathode ray tube in successive time sequence. Since the index signal is derived from the scanning of the electron beam, the index signal is related to the scanning velocity of that beam. Thus, the gating of the respective color control signals, referred to as color switching, desirably is synchronized with the beam velocity. This means that when the beam moves into scanning alignment with, for example, a red phosphor element, the red control signal is gated so as to modulate the beam with red signal information. Then, as the beam moves into proper scanning alignment with the green phosphor element, the red control signal is interrupted and the green control signal is gated so as to modulate the beam. Similarly, when the beam next moves into proper scanning alignment with a blue phosphor element, the green control signal is interrupted and the blue control signal is gated to modulate the beam. The foregoing gating sequence is repeated so that, as the beam scans the red, green and blue phosphor elements, it is concurrently and synchronously modulated with the red, green and blue color information.

In a beam index color television receiver of the type described in the above-mentioned applications, red, green and blue gates are provided for the red, green and blue color information signals, respectively, and each of these red, green and blue gates is opened individually and in sequence as the beam scans a horizontal line such that the respective color control signals are gated in time correspondence with the position of the beam at a color phosphor stripe that is associated with the gated color control signal. Typically, in such apparatus, the color control signals are supplied to the cathode ray tube from the respective gates through a video amplifier. However, due to the load resistance and a stray capacitance in the video amplifier, the phase of the signal applied to the grid of the cathode ray tube is phase delayed in accordance with the level of the color control signal supplied to the video amplifier. That is, the phase of the signal supplied to the cathode ray tube is delayed a greater amount for color control signals having a higher level.

As a result of such phase delay, when the electron beam is modulated by a particular one of the color control signals, the electron beam landing spot may be shifted from its desired position on the respective color phosphor stripe which is to be scanned. Since adjacent color phosphor stripes are separated by a black material formed of, for example, carbon or the like, the delay in phase of the color control signal may cause the electron beam landing spot to be shifted so as to overlap the adjacent black material. This reduces the size of the landing spot on the respective color stripe with a resultant change in hue and a decrease in color saturation and relative luminance of the reproduced video image. Since the video amplifier delays the phase of the color control signal to a greater extent for higher-level signals, the higher the level of the color control signal, the greater the misalignment of the beam landing spot relative to the respective color control stripe. This misalignment is even further enhanced by the fact that the size of the electron beam landing spot is larger for higher level color control signals. In such case, it is even possible that, with the large beam spot size and the increased phase delay, the landing spot may be shifted or misaligned so as to contact the next adjacent color stripe. Such misalignment causing contact with a color stripe next adjacent the desired stripe may occur when, for example, a gain control is used to increase the beam current.

OBJECTS AND SUMMARY OF THE INVENTION

Accordingly, it is an object of this invention to provide improved apparatus for controlling the electron beam in a beam index color television receiver that avoids the above-described difficulties encountered with the prior art.

More particularly, it is an object of this invention to provide an apparatus for controlling the electron beam in a beam index color television receiver in which the electron beam is caused to scan the respective color phosphor stripes in time correspondence, regardless of the varying levels of the color control signals.

Another object of this invention is to provide apparatus for controlling the electron beam in a beam index color television receiver in which the gate pulse signals used for gating respective color control signals have their phase changed in response to the level of the color control signals supplied to the cathode ray tube.

Still another object of this invention is to provide apparatus for controlling the electron beam in a beam index color television receiver in which the gate pulse signals for gating respective color control signals have their phase changed in response to the highest level one of the color control signals supplied to the gating circuits.

In accordance with an aspect of this invention, apparatus is provided for controlling the electron beam in a beam index color television receiver of the type having a cathode ray tube which is provided with beam-excitable color elements disposed on a display screen of the cathode ray tube and index elements which are scanned by the beam as the beam scans the display screen, such apparatus including means for generating an index signal in response to the scanning of the index elements by the beam, means for sequentially gating respective color control signals individually to modulate the electron beam as the beam scans the color elements, means for generating gate pulse signals in response to the index signal and for supplying the gate pulse signals to the means for gating to control the latter to gate the respective color control signals, and phase control means for controlling the phase of the gate pulse signals in response to the level of the color control signals.

In a preferred embodiment of this invention, the phase control means changes the phase of the gate pulse signals in response to the highest level one of the color control signals and includes a control signal generator receiving the color control signals and producing an output corresponding to the highest level one of such signals and a phase shifter supplied with the output from the control signal generator and supplying a phase-shifted pulse signal to a gating pulse generator which generates sequential gating pulses for controlling the operation of the means for sequentially gating.

The above, and other, objects, features and advantages of the invention, will be apparent in the following detailed description of illustrative embodiments of the invention which is to be read in connection with the accompanying drawings.

BRIEF DESCRIPTION OF THE DRAWINGS

FIG. 3 is a block diagram of a first embodiment of an apparatus according to this invention for controlling the electron beam in a beam index color television receiver;

FIG. 4 is a block diagram of a second embodiment of an apparatus according to this invention for controlling the electron beam in a beam index color television receiver;

FIGS. 10A–10G are waveform diagrams to which reference will be made in describing the operation of the embodiment shown in FIG. 3;

FIGS. 11A–11E are waveform diagrams to which reference will be made in describing the operation of the voltage controlled oscillators shown in FIGS. 7 and 8; and FIGS. 12A–12E are waveform diagrams to which reference will be made in describing the operation of the embodiment shown in FIG. 4.

DETAILED DESCRIPTION OF THE PREFERRED EMBODIMENTS

Figure 1:
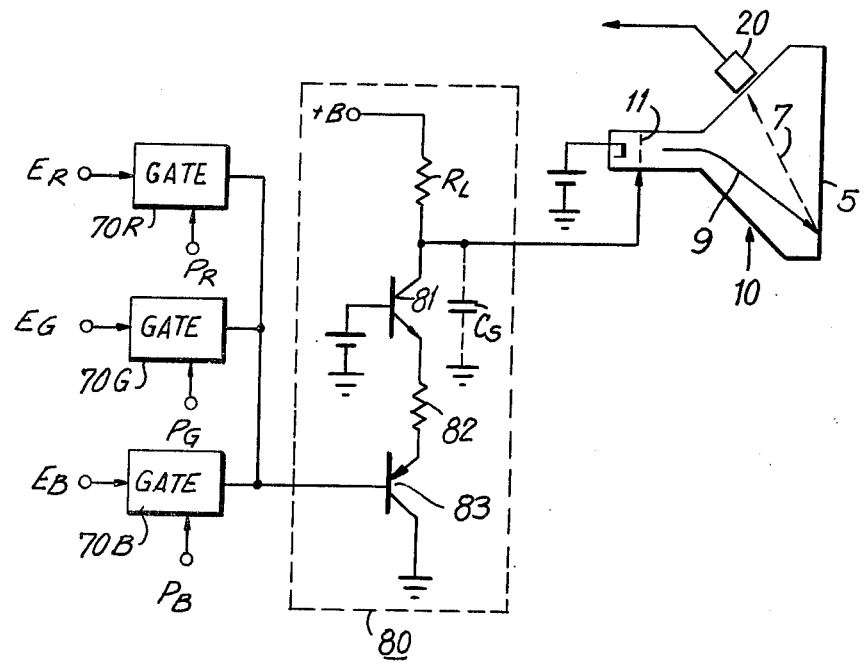
FIG. 1 is a block-circuit wiring diagram of a gating circuit and video amplifier used in a known beam index color television receiver.
Figure 2A:
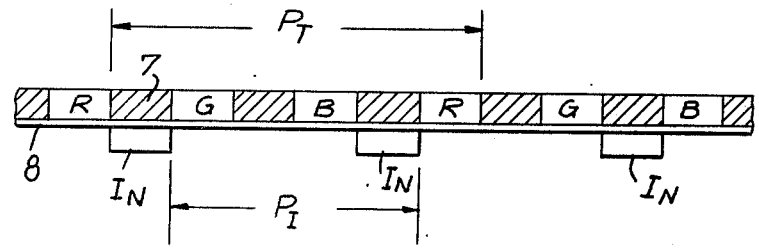
FIG. 2A is a schematic representation of a portion of the display screen of a cathode ray tube used in a beam index color television receiver.
Figure 2B:
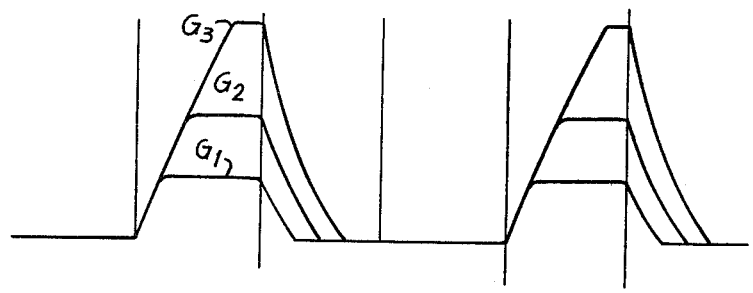
FIG. 2B is a graphical diagram illustrating the phase shift along the portion of the display screen due to the video amplifier of FIG. 1.

Referring to the drawings in detail, and initially to FIG. 1 thereof, it will be seen that, in a known beam index color television receiver of a type to which this invention may be readily applied, a single beam cathode ray tube 10 is provided with a display screen 5 having triads of red, green and blue color phosphor elements, R, G and B, respectively (FIG. 2). As is known, each phosphor element emits light of a respective color when excited by a scanning electron beam, the intensity of the light emitted thereby being determined by the intensity of the impinging beam. The triads of vertically extending phosphor elements of stripes R, G and B exhibit a pitch $P_T$ and repeat in the horizontal scanning direction of the beam, in the order RGBRGBRGB . . . Adjacent color phosphor elements are separated by bands 7 of a black material, for example, of carbon or the like. The bands 7 of black material and the color phosphor elements R, G and B are provided on the back or inner surface of the usual glass face plate or panel (not shown) of tube 10.

A metallic layer 8, for example, of aluminum, is thinly coated, as by vapor deposition, over the entire rear surface of screen 5 so as to be effective as a light reflector while being substantially transparent to electrons. Thus, the electron beam 9 can penetrate metallic layer 8 to excite color phosphor stripes R, G, and B, while light emitted from the color phosphor stripes as a result of such excitation is, for the most part, reflected forward toward the viewer rather than being directed into the color cathode ray tube 10.

Index phosphor stripes or elements $I_N$ extend vertically on the back surface of metallic layer 8 at locations spaced apart horizontally over the area of the screen. The index stripes or elements $I_N$ are arranged in predetermined positional relationships to the color phosphor stripes R, G and B. For example, in the illustrated embodiment, the pitch or spacing $P_I$ between the index elements $I_N$ is selected to be two-thirds the pitch $P_T$ of the triads of red, green and blue phosphor stripes R, G and B, with the index elements $I_N$ being located between the adjacent red, green and blue phosphor stripes R, G and B.

As the electron beam scans the display screen 5, index elements $I_N$ are excited to emit light, but this light cannot pass through reflected metal layer 8 and, therefore, does not interfere with the color television picture which is produced by exciting the color phosphor elements as the beam scans successive horizontal lines. Thus, a viewer perceives a color video picture without undesired interferences due to the excitation of index elements $I_N$. As will be hereinafter described in detail, at the outside of the funnel-shaped portion of the envelope of color cathode ray tube 10, there is provided a photo-detector 20 which is operative to detect light emitted from any one of index elements $I_N$, as indicated by the arrow 7 in broken lines, whenever such index element is excited by electron beam 9 scanning the same.

In the illustrated beam index color television receiver of FIG. 1, red, green and blue primary color signals $E_R$, $E_G$ and $E_B$ are selectively applied through switching or gate circuits 70R, 70G and 70B, respectively, to a first grid 11 of tube 10 by which the beam current of electron beam 9 is controlled as the latter scans the respective color phosphor stripes R, G and B. Gate circuits 70R, 70G and 70B, may comprise an analog gating device which is conditioned to gate, or transmit, analog signals that are applied thereto when gating pulse signals $P_R$, $P_G$ and $P_B$, respectively, are applied to coincidence with the respective analog signal. The gating pulse signals $P_R$, $P_G$ and $P_B$ are phase shifted by 120° relative to each other so as to sequentially open the respective gate circuits to allow passage of primary color signals $E_R$, $E_G$ and $E_B$ in sequence as electron beam 9 scans the respective color phosphor stripes R, G and B, with the result that the primary color signals are synchronously applied to grid 11 of tube 10. Thus, when gate circuit 70R is enabled to gating pulse signal $P_R$, this gate circuit is opened so as to transmit the red color control, or information, signal $E_R$. Similarly, when gate circuit 70G is enabled by gating pulse signal $P_G$, this gate circuit is opened to transmit the green color control, or information, signal $E_G$. Finally, when gate circuit 70B is enabled by gating pulse signal $P_B$, gate circuit 70B opens to transmit the blue color control, or information, signal $E_B$.

The outputs of gate circuits 70R, 70G and 70B are connected in common to a video amplifier 80 which, in turn, supplies the gated color control, or information, signal to grid 11. As shown in FIG. 1, video amplifier 80 includes a first transistor 83 which receives the outputs of gate circuits 70R, 70G and 70B at its base and has its collector connected to ground. A second transistor 81 has its emitter connected to the emitter of transistor 83 through a resistor 82 and its collector connected grid 11 for supplying the appropriate color control signal thereto. The collector of transistor 81 is also connected to a voltage source B through a load resistor $R_L$. However, since a stray capacitance $C_S$ exists between the collector of transistor 81 (or grid 11) and ground, a phase delay is imparted to the color control signal supplied to grid 11 which is greater for higher level signals, as shown in the corresponding waveform diagram of FIG. 2B. That is, as the base potential to transistor 83 is increased so as to increase the potential applied to grid 11, the phase delay is also increased, in accordance with the time constant determined by load resistor $R_L$ and stray capacitance $C_S$.

As is well known, as the signal level of the color control signal is increased, this results in an increased electron beam landing spot size. For example, a high color signal level may result in an electron beam landing spot of a diameter equal to or greater than the width of the respective color phosphor stripe, while in comparison, a small color signal level will result in a landing spot size less than the width of the respective color phosphor stripe. Thus, although video amplifier 80 imparts a phase delay to the color control signal having a low level, the resultant electron beam landing spot will only be shifted a small amount so as to still be positioned entirely or almost entirely on the respective color phosphor stripe. However, when a color control signal of a high level is phase shifted by video amplifier 80, such phase delay is of a greater amount and, because the landing spot may already be as large as the respective color phosphor stripe, this phase delay will result in a substantial misalignment with the respective color phosphor stripe. For example, the landing spot may be shifted so as to have only half of its area covering the color phosphor stripe while the remainder of the landing spot also covers an adjacent black material 7. In an extreme case, the landing spot may be shifted so as to excite a color phosphor stripe next adjacent the desired stripe. Thus, the phase delay may result in hue, color saturation and relative luminance errors in the displayed video image.

Referring now to FIG. 3, one embodiment of an apparatus according to this invention for controlling the electron beam in a beam index color television receiver will now be described, with elements corresponding to those described above with reference to the prior art television receiver of FIG. 1 being identified by the same reference numerals. It will be assumed that the color television receiver of FIG. 3 includes conventional circuitry (not shown) by which the red, green and blue color control, or information, signals $E_R$, $E_G$ and $E_B$, respectively, are derived from a received composite color television signal. It also is assumed that conventional beam deflection apparatus (not shown) is provided to deflect the electron beam for scanning a conventional raster across display screen 5.

In FIG. 3, a beam index color television receiver according to the present invention is shown to comprise a cathode ray tube 10 of the type generally described above with reference to FIG. 1 and having a first grid 11 which is adapted to be supplied with primary color signals $E_R$, $E_G$ and $E_B$ for the purpose of modulating the density or intensity of the electron beam 9 which passes through this grid. Cathode ray tube 10 further includes a display screen 5 which may be identical to the display screen of FIG. 2A. Display screen 5 is arranged such that index elements $I_N$ face the beam source, and the color stripes R, G and B are disposed to face toward a viewer through the transparent face plate of the tube. Thus, the electron beam impinges upon index elements $I_N$ first, then passes through metal layer 8 to excite the color phosphor elements as the beam scans successive horizontal lines. As the electron beam scans display screen 5, index elements $I_N$ are excited to emit light which is reflected off metal layer 8 and thus does not pass therethrough toward the receiver.

As previously discussed in relation to FIG. 1 a photo-detector 20 is associated with cathode ray tube 10 and is adapted to receive light which is emitted by each index element $I_N$ when the latter is excited by the electron scanning beam. Thus, as the electron beam 9 scans each index element $I_N$, the resulting light 7 emitted from the index element is detected by photo-detector 20 which produces a corresponding output signal applied to a band pass filter 30. The filter 30 is designed to pass an index signal $S_I$ in a frequency band determined by the pitch $P_I$ between the adjacent index elements $I_N$ and the scanning speed of electron beam 9.

Referring to FIG. 3, it will be seen that, for the purpose of obtaining color switching, that is, controlling the operations of the switching or gate circuits 70R, 70G and 70B, in the beam index color television receiver, index signal $S_I$ from band pass filter 30 is supplied to a phase-locked loop (PLL) circuit 40 which is operative to provide a signal $P_O$ (FIG. 10A) synchronized with the index signal $S_I$ and having a frequency twice that of the index signal. Phase-locked loop circuit 40 may include a voltage controlled oscillator 42 providing oscillation pulses with a central frequency which is approximately twice the frequency of the index signal $S_I$, and which are frequency divided by two in a frequency divider 43. The resulting frequency divided pulses $P_N$ are fed to a phase comparator 41 to be phase compared therein with the index signal $S_I$ from band pass filter 30. The resulting compared error voltage from phase comparator 41 is applied through a low-pass filter 44 as the control voltage for voltage controlled oscillator 42 which thus produces the pulses $P_O$ phase locked to twice the frequency of index signal $S_I$.

Figure 7:
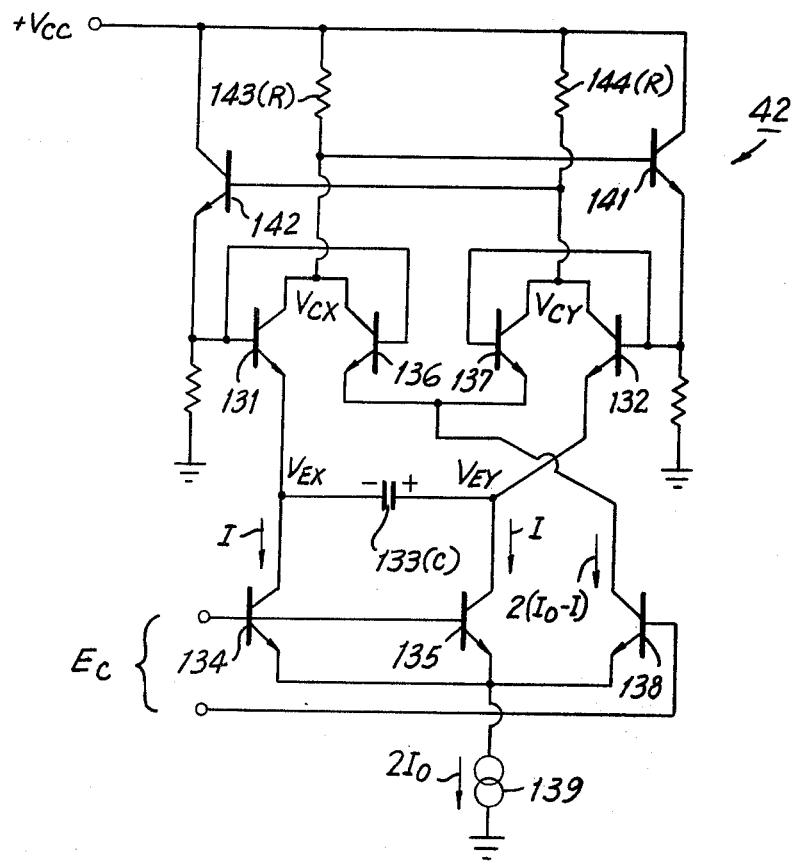
FIG. 7 is a circuit wiring diagram of a voltage controlled oscillator that may be utilized in a phase-locked loop circuit on FIG. 3.

Referring now to FIG. 7, there is shown a voltage-controlled oscillator (VCO) 42 which can be utilized in phase locked loop 40 of FIG. 3. VCO 42 is shown to be formed from a pair of emitter coupled multivibrators including a first pair of transistors 131 and 136 having their collectors and bases connected together and a second pair of transistors 132 and 137 also having their collectors and bases connected together, and in which the collectors of each pair of transistors are connected to a voltage source $+V_{CC}$ through resistors 143 and 144, respectively, each having a resistance value R. The emitters of transistors 136 and 137 are directly connected together, and the emitters of transistors 131 and 132 are connected together through a capacitor 133 having a capacitance C. Transistors 136 and 137 have their emitters connected to the collector of a transistor 138 and the emitters of transistors 131 and 132 are connected to the collectors of transistors 134 and 135, respectively, which transistors 134 and 135 have a common base. The emitters of transistors 134, 135 and 138 are connected together and connected to ground through a constant current source 139 which generates a current $2I_O$. A control voltage $E_C$ from low pass filter 44 on FIG. 3 is applied between the common base of transistors 134 and 135 and the base of transistor 138. Further, transistors 131 and 136 have their common base connected to the emitter of a transistor 142 which has its collector also connected to power supply $+V_{CC}$, while the base of transistor 142 is connected to the collectors of transistors 132 and 137. The common base of transistors 132 and 137 is, in like manner, connected to the emitter of a transistor 141 which also has its collector connected to power supply $+V_{CC}$ and its base connected to the collectors of transistors 131 and 136.

If the power supply voltage has a value $+V_{CC}$, the base-emitter forward voltage drop of each transistor is $V_{BE}$, the capacitance of capacitor 133 is C, the current generated by constant current source 139 is $2I_O$, the resistance value of each of load resistors 143 and 144 is R, and the current through each of transistors 134 and 135 is I (since the current through transistor 134 is equal to that through transistor 135), then, the emitter potentials $V_{EX}$, $V_{EY}$ and collector potentials $V_{CX}$, $V_{CY}$ of transistors 131 and 132, respectively, are varied as shown in FIGS. 11A-11D. That is, at the instant when transistors 131 and 136 turn ON, transistors 132 and 137 turn OFF. At this time, transistor 131 develops at its emitter terminal, a potential $V_{EX}$ having a value $V_{CC}-2V_{BE}$, and the transistor 132 develops at its emitter terminal, a potential $V_{EY}$ having a value $V_{CC}-2V_{BE}+2I_O\cdot R$. Thus, the charged voltage across capacitor 133 equals $2I_O\cdot R$ having a polarity as shown in FIG. 7. Thereafter, the sum 2I of the currents flowing through transistors 134 and 135 flows through transistors 131, since transistor 132 is turned OFF. This means that, since the currents through transistors 134 and 134 are equal, a current I flows from the emitter of transistor 131, through capacitor 133, to the collector of transistor 135. As a consequence thereof, the emitter potential $V_{EY}$ of transistor 132 is reduced at a rate determined by the slope having a value I/C, where I is the current flowing through capacitor 133 and C is the value of the capacitance thereof. This means that a current $2(I_O-I)$ flows through transistors 138 and 136, resulting in a current of $2I_O$ flowing through load resistor 143. When the voltage across capacitor 133 reaches a value $2I_O\cdot R$ with a polarity opposite to that shown in FIG. 7, transistors 132 and 137 turn ON, and transistors 131 and 136 turn OFF. This is due to the positive feedback loop of transistors 132, 137, 142 and 131, 136. The foregoing operation is then repeated with the current flowing from the emitter of transistor 132 to transistor 134 through capacitor 133 and so on. Therefore, the oscillation frequency of VCO 42 can be determined from the value of I/C, and since the current I flowing through transistors 134 and 135 can be regulated by control voltage $E_C$, the oscillation frequency can accordingly be changed.

Referring back to FIG. 3, the oscillating pulses $P_O$ from VCO 42, which are phase-locked to the filtered index signal and have a frequency that is twice the frequency of the index signal, are fed to a gate pulse generator 60 through a phase shifter 50. For the purpose of the present discussion, it is sufficient to state merely that gate pulse generator 60, in accordance with a pulse $P_{MS}$ applied thereto, generates successive 3-phase gating pulse signals $P_R$, $P_G$ and $P_B$, at a frequency of one-third the frequency of pulses $P_O$ from phase-locked loop circuit 40, that is, two-thirds the frequency of index signal $S_I$, with the pulses $P_R$, $P_G$ and $P_B$ being sequentially displaced in phase by 120°, as shown on FIGS. 10D, 10E and 10F, respectively.

Gating pulse signals $P_R$, $P_G$ and $P_B$ are supplied to gate circuits 70R, 70G and 70B, respectively to enable the gate circuits to pass therethrough the red, green and blue primary color control signals $E_R$, $E_G$ and $E_B$, respectively. Each of the switching or gate circuits 70R, 70G and 70B may comprise an analog gating device which is conditioned to gate, or transmit, analog signals that are supplied thereto when the appropriate gating pulse signals are applied in coincidence with the analog signal. Gate circuits 70R, 70G and 70B are connected to receive the color control, or information signals $E_R$, $E_G$ and $E_B$, respectively, which are derived from conventional demodulating circuitry (not shown) normally provided in a color television receiver. The gate circuits of FIG. 3 operate in a manner identical to the gate circuits of FIG. 1. Thus, when gate circuit 70R is enabled by a gating pulse signal $P_R$, this gate circuit is opened so as to transmit the red color control signal $E_R$ and so on. Thus, the red, green and blue primary color control signals $E_R$, $E_G$ and $E_B$ are transmitted from the gate circuits in regular succession to appear as a sequence of color control signals, which are then supplied to first grid 11 of cathode ray tube 10 through video amplifier 80 for density modulating electron beam 9 as the latter scans the red, green and blue stripes R, G and B, respectively.

However, as previously discussed, video amplifier 80 imparts a phase delay to the color control signals supplied thereto, which may result in misalignment of the electron beam landing spot with the respective color phosphor stripe on display screen 5 and a consequent change in hue and color saturation of the displayed video image on display screen 5. The present invention compensates for such phase delay by suitably controlling the phase shifter 50 interposed between phase-locked loop circuit 40 and gate pulse generator 60 for altering the phase of the oscillating pulse signal $P_O$ supplied to gate pulse generator 60. For effecting such control of phase shifter 50, a control signal generator 90 is supplied with color control signals $E_R$, $E_G$ and $E_B$ and produces a corresponding phase shift control signal which is applied to phase shifter 50 and varies the amout of phase shift imparted to oscillating pulse signal $P_O$ in response to changes in the level of the color control signals $E_R$, $E_G$ and $E_B$.

Figure 5:
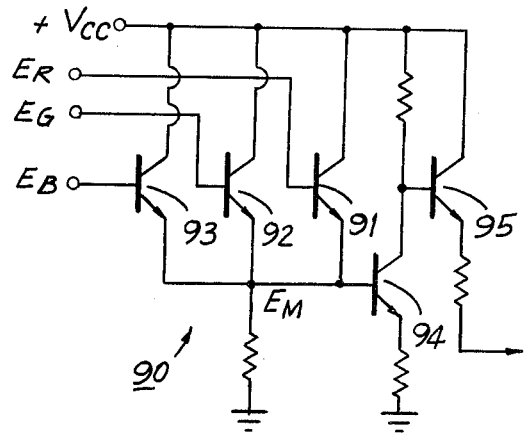
FIG. 5 is a circuit wiring diagram of a control signal generator which can be utilized with this invention.
Figure 9:
FIG. 9 is a waveform diagram showing one example of the relationship between the levels of the primary color control signals.

One embodiment of a control generator 90 which can be utilized in the circuit of FIG. 3 is shown in FIG. 5. In such embodiment, control signal generator 90 is shown to include three transistors 91, 92 and 93 which have their emitters connected together and their bases supplied with the primary color control signals $E_R$, $E_G$ and $E_B$, respectively, so as to produce at the common emitter junction a signal $E_M$ (FIG. 9) corresponding to the level of that one of the primary color control signals $E_R$, $E_G$ and $E_B$, which is then highest. Therefore, at all times, one of transistors 91, 92 and 93 is turned ON, while the other two transistors are turned OFF. A transistor 94 has its base connected to the common emitter junction of transistors 91, 92 and 93 and acts to invert maximum voltage signal $E_M$ at its collector. This inverted signal is then supplied to the base of a transistor 95 which, at its emitter terminal, supplies the phase shift control signal to phase shifter 50. It is to be realized, however, that, although FIG. 5 shows a control signal generator 90 which employs the highest-level one of the primary color control signals to control the amount of phase shift in phase shifter 50, this circuit is only a preferred embodiment of a control signal generator that can be utilized according to this invention. In other words, it is not necessary to utilize the highest-level one of the primary color control signals and, for example, the color control signal being supplied through the open one of gates 70R, 70G or 70B at any time can be utilized to control the amount of phase shift in phase shifter 50.

Figure 6:
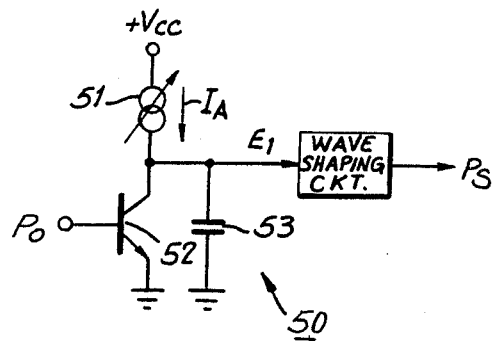
FIG. 6 is a circuit wiring diagram of a phase shifter that may be utilized with the embodiment of this invention, shown on FIG. 3.

Referring now to FIG. 6, it will be seen that an embodiment of a variable phase shifter 50 that may be employed in the circuit of FIG. 3 includes a constant current source 51, which produces a constant current $I_A$, controlled by the control signal from control signal generator 90, and which is connected in series with the collector-emitter path of a transistor 52, between a voltage source $+V_{CC}$ and ground. A capacitor 53 is connected in parallel with the collector-emitter path of transistor 52 which is supplied, at its base, with output pulse $P_O$ from VCO 42 of phase-locked loop circuit 40. The voltage $E_I$ (FIG. 10B) developed across capacitor 53 is then supplied to a wave shaping circuit 54 to produce therefrom an output pulse $P_S$ (FIG. 10C) as the output of phase-shifter 50.

When output pulse $P_O$ from VCO 42 is at logic level "1" (FIG. 10A) so as to turn transistor 52 ON, the voltage $E_I$ (FIG. 10B) across capacitor 53 is at ground potential. However, when output pulse $P_O$ is at logic level "0" so as to render transistor 52 inoperative, capacitor 53 is charged by the current $I_A$ from constant current source 51, resulting in the voltage $E_I$ across capacitor 53 being increased at a certain rate. When voltage $E_I$ has a value above a threshold level $V_O$ (FIG. 10B) of waveform shaping circuit 54, output pulse $P_S$ (FIG. 10C) from phase-shifter 50 has a logic level value of "0". On the other hand, output pulse $P_S$ takes on a value of logic level "1" when $E_I$ falls below threshold level $V_O$. Consequently, the falling or negative-going edge of output pulse $P_S$ is delayed with respect to the falling edge of output pulse $P_O$ from VCO 42, although the rising or positive-going edges thereof coincide. This is particularly significant since gate pulses $P_R$, $P_G$ and $P_B$ from gate pulse generator 60 are produced at the falling edges of output pulse $P_S$, as shown in FIGS. 10D-10F. Thus, for example, if the current $I_A$ from constant current source 51 is increased in proportion to the maximum value voltage $E_M$, an increase in voltage $E_M$ will cause voltage $E_I$ to have a greater slope, thereby advancing the time when output pulse $P_S$ falls off to its logic level "0" value, as indicated by the dashed lines which are to the left of the solid lines on FIG. 10C. Accordingly, this results in gate pulse signals $P_R$, $P_G$ and $P_B$ being advanced in phase in correspondence with such increase in voltage $E_M$. The phase advance of gate pulse signals $P_R$, $P_G$ and $P_B$ is seen to be greater for higher-level color control signals in order to compensate for the phase delay from video amplifier 80. Consequently, the electron beam landing spot accurately scans the color phosphor stripes regardless of changes in the signal level, resulting in no changes in hue, and no relative reduction of luminance and color saturation. It is to be noted that, as shown in FIG. 10G, output pulse $P_N$ from frequency divider 43 of PLL circuit 40 is made to reverse, that is, to rise and fall, at the rising edges of successive output pulses $P_O$ from VCO 42. This results in a duty factor of 50% at all times, such that the phase of pulse $P_N$ is not influenced by phase changes of output pulse $P_S$ from variable phase shifter 50.

Referring now to FIG. 4, it will be seen that, in another embodiment of the invention for controlling the electron beam in a beam index color television receiver, elements corresponding to those described above with reference to the apparatus of FIG. 3 are identified by the same reference numerals. In the apparatus of FIG. 4 VCO 42' also performs the phase-shifting function of the omitted phase-shifter 50 of FIG. 3 and delivers output pulse $P_S$ to gating pulse generator 60.

Figure 8:
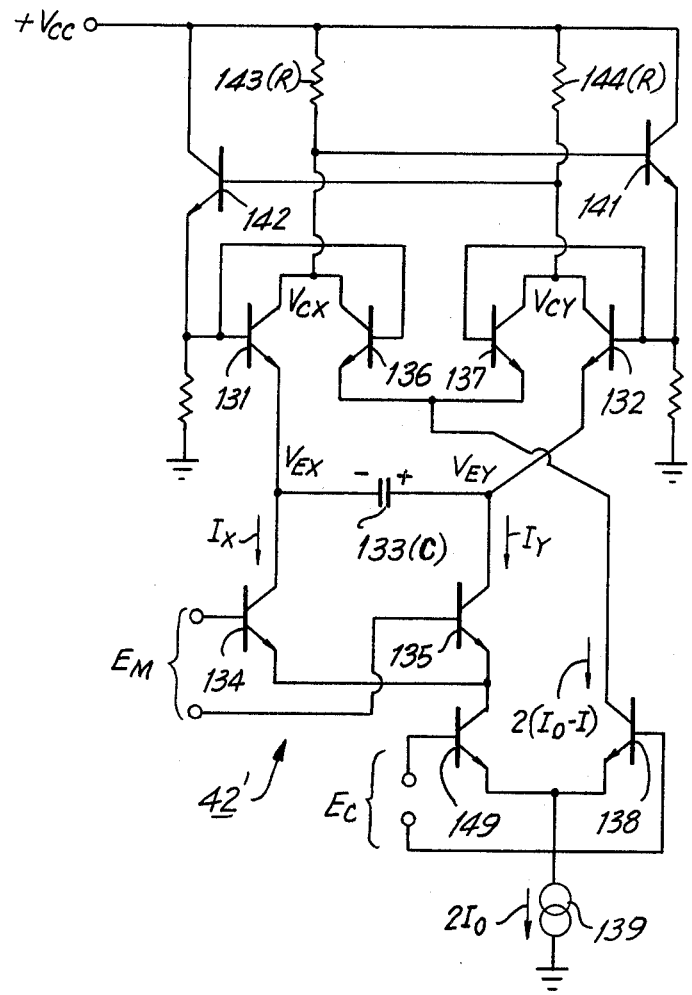
FIG. 8 is a circuit wiring diagram of a voltage controlled oscillator that may be utilized in a phase-locked loop circuit of FIG. 4.

As shown in FIG. 8, a voltage-controlled oscillator 42', which can be utilized in the circuit of FIG. 4, is identical to VCO 42 of FIG. 7 with the following exceptions: In VCO 42', the emitters of transistors 134 and 135 are connected to the collector of a transistor 149 which has its collector-emitter path connected in series with the collector-emitter path of transistor 135. The emitters of transistors 149 and 138 are connected together and the junction thereof is connected to constant current source 139. Further, the bases of transistors 134 and 135 are no longer connected together and the maximum voltage signal $E_M$ from control signal generator 90 is supplied between these bases, whereas the voltage $E_C$ from low-pass filter 44 is supplied between the bases of transistors 149 and 138. Thus, when the voltage $E_C$ supplied from low-pass filter 4 is supplied to transistors 149 and 138 so as to change the ratio of currents through these transistors, the oscillation frequency of VCO 42' can be changed in a manner similar to that previously described in regard to VCO 42 of FIG. 7.

However, in VCO 42', currents $I_X$ and $I_Y$ through transistors 134 and 135, respectively, are no longer equal, although there is a fixed relationship between such currents which is defined by the expression, $I_X + I_Y + 2I$. In other words, although the maximum voltage signal $E_M$ applied between the bases of transistors 134 and 135 is varied so as to vary the relative ratio of currents $I_X$ and $I_Y$, the sum of these currents is always equal to $2I$. Thus, output pusle $P_S$ (FIG. 12A) from VCO 42' is phase-shifted in a manner similar to that in phase-shifter 50 of FIG. 3. Consequently, gate pulse $P_R$, $P_G$ and $P_B$ (FIGS. 12B, 12C and 12D, respectively) are correspondingly phase-shifted so that the electron beam accurately scans the respective color phosphor stripes regardless of changes in the color control signal level. Further, it is seen in FIG. 12E that output pulse $P_N$ from frequency divider 43 is reversed, that is, rises and falls at the rising edges of output pulse $P_S$ of VCO 42'. This results in a duty factor of 50% and a frequency dividing pulse $P_N$ which does not have its phase affected by the phase change of output pulse $P_S$ of VCO 42'.

It will be appreciated that the phase-shifting process according to this invention need not be carried out in phase shifter 50 or VCO 42', as described above. For example, the phase-shifting may be applied to index signal $S_I$ from band-pass filter 30 or to frequency divided output pulse $P_N$ from frequency divider 43 of PLL circuit 40, rather than to the output pulses from voltage controlled oscillator 42 of PLL circuit 40. Further, although the invention has been described above as being applied to a beam index color cathode ray tube 10 in which pitch $P_I$ of index elements $I_N$ is two-thirds pitch $P_T$ of the triads of red, green and blue phosphor stripes R, G and B, it will be appreciated that the invention can be similarly applied to a beam index color cathode ray tube in which the pitch of the index elements or stripes $I_N$ is equal to that of the triads of red, green and blue color phosphor stripes, or is an integral multiple thereof.

Having described specific preferred embodiments of the invention with reference to the accompanying drawings, it is to be understood that the invention is not limited to those precise embodiments, and that various changes and modifications may be effected therein by one skilled in the art without departing from the scope of the invention as defined in the appended claims.

What is claimed is:

1. Apparatus for controlling the electron beam in a beam index color television receiver of the type having a cathode ray tube which is provided with a display screen having beamexcitable color elements to be scanned by the electron beam as the beam is modulated by color control signals, and index elements which are scanned as the beam scans said display screen, said apparatus comprising:
   means for generating an index signal in response to the scanning of said index elements by said beam;
   gating means for sequentially gating said color control signals individually for modulating said electron beam as said beam scans the respective ones of said color elements;
   means for generating gating pulses in response to said index signal and for supplying said gating pulses to said gating means so as to cause the latter to gate said color control signals; and
   phase control means for controlling the phase of said gating pulses in response to the level of said color control signals.

2. Apparatus according to claim 1; in which said phase control means includes means for phase-shifting said gating pulses and control signal generator means receiving said color control and controlling the amount of phase-shift imparted to said gating pulses by said means for phase-shifting.

3. Apparatus according to claim 2; in which said control signal generator means supplies a control signal to said means for phase-shifting in response to the highest level one of said color control signals.

4. Apparatus according to claim 3; in which said color control signals include three primary color control signals, said control signal generator means includes three transistors, each transistor having an input electrode receiving a respective one of said primary color control signals and an output electrode, the output electrodes of said transistors being connected together to produce said control signal in response to the highest level one of said primary color control signals.

5. Apparatus according to claim 2; in which said means for generating and supplying the gating pulses includes means for producing said gating pulses at a frequency synchronized with the frequency of said index signal, and means for sequentially supplying said gating pulses to said gating means to cause the latter to gate said respective color control signals, and said means for phase-shifting includes a phase-shifter receiving an output signal from said means for producing and supplying a corresponding phase-shifted signal to said means for sequentially supplying.

6. Apparatus according to claim 5; in which said control signal generator means supplies a control signal corresponding to the level of said color control signals to said phase-shifter and said phase-shifter includes a transistor having an input electrode receiving said output signal from the means for producing and having an emitter-collector path connected in series with a variable current source between a voltage source and ground, a capacitor connected in parallel with said emitter-collector path, and a wave shaping circuit connected to said capacitor for producing said phase-shifted signal, said variable current source being responsive to the level of said control signal from said control signal generator means.

7. Apparatus according to claim 2; in which said means for generating and supplying gating pulses includes means for producing said gating pulses at a frequency synchronized with the frequency of said index signal, and which includes controllable oscillator means for generating said gating pulses and having two inputs, and means, for sequentially supplying said gating pulses to said gating means to control the latter to gate the respective color control signals.

8. Apparatus according to claim 7; in which said controllable oscillator means additionally acts as said means for phase-shifting to phase shift said generated gating pulses, and said control signal generator means supplies a control signal to one of said inputs of said oscillator means for controlling the amount of phase-shift imparted to said gating pulses by said oscillator means.

9. Apparatus according to claim 1; in which said means for generating and supplying gating pulse includes a phase-locked loop having a controllable oscillator for producing an oscillating signal and a phase comparator for comparing said oscillating signal to said index and for adjusting the phase of said oscillating signal to be synchronized with said index signal.

10. Apparatus according to claim 9; in which said index elements are excited so as to emit light as they are scanned by said electron beam, and in which said means for generating an index signal includes a photo-detector receiving said emitted light from said index elements to produce a periodic signal having a frequency equal to the frequency at which the index elements are excited, and a filter receiving said periodic signal for supplying said index signal to said phase comparator.

11. Apparatus according to claim 9; in which said means for generating and supplying gating pulses further includes a gating pulse generator for sequentially applying said gating pulses to said gating means for causing the latter to sequentially gate said respective color control signals.

12. Apparatus according to claim 11; in which said gating means includes a plurality of gates each supplied with a respective series of said gating pulses and a respective one of said color control signals, for supplying said color control signals individually to modulate said electron beam when a respective gating pulse and color control signal are both applied to the corresponding gates.

13. Apparatus according to claim 1; in which said phase control means controls the phase of said gating pulses in response to the highest level one of said color control signals.

* * * * *